United States Patent Office 3,087,527
Patented Apr. 30, 1963

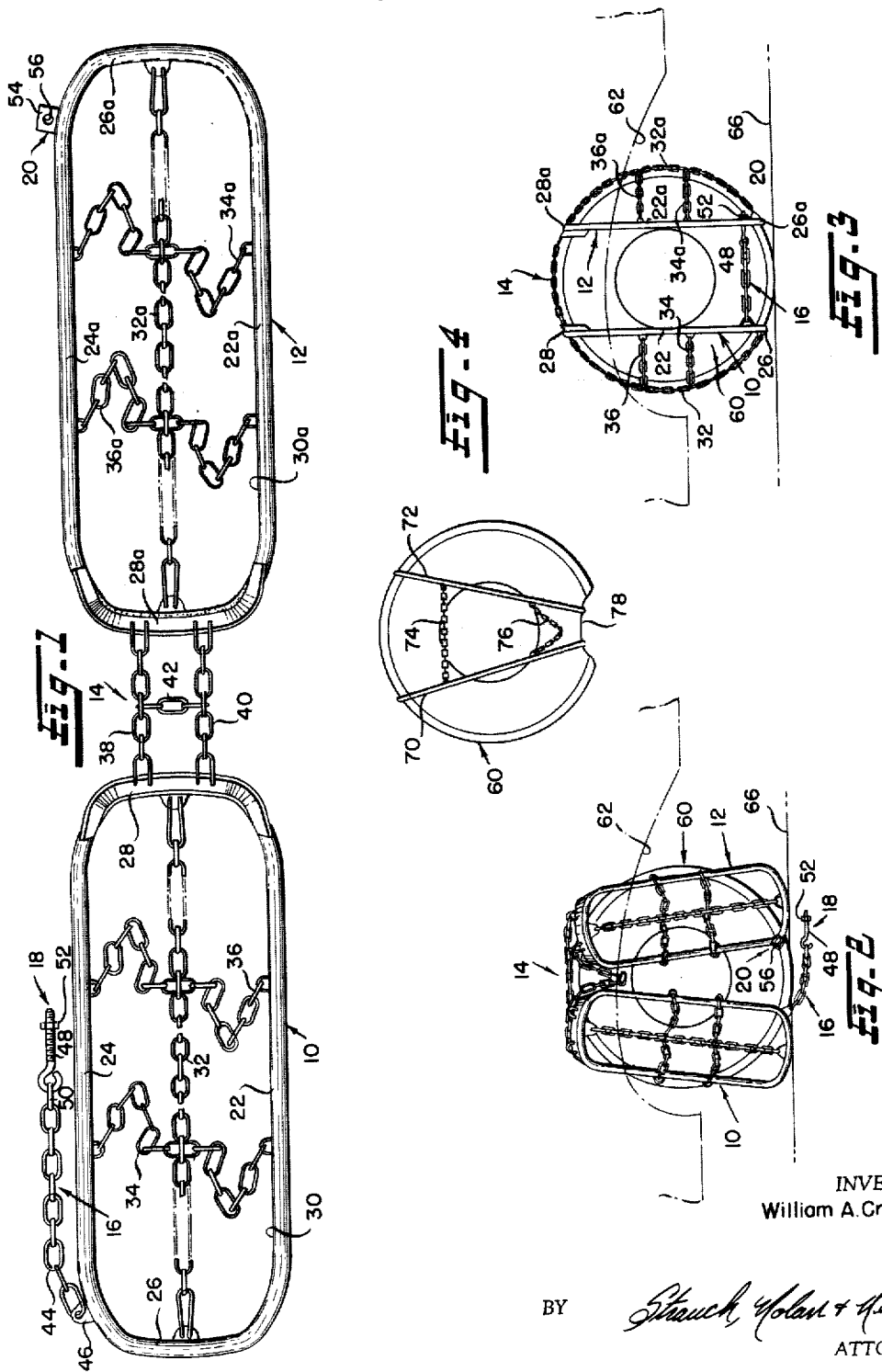

3,087,527
TRACTION DEVICE FOR VEHICLES
William A. Crider, 1216 Kelley St. SW., Vienna, Va.
Filed Mar. 20, 1961, Ser. No. 96,852
9 Claims. (Cl. 152—226)

The present invention relates to improvements in traction devices of vehicles and more particularly to selectively and readily mountable and de-mountable traction devices for pneumatic tire equipped automotive vehicle drive wheel.

As is well known, present day so-called automobile tire chains are so difficult, time consuming and unpleasant to mount on and de-mount from a wheel, particularly with modern day automotive fender construction which, at least, partially and usually substantially enclose the rear vehicle drive wheels, that most drivers will avoid using chains where they can possibly avoid doing so, even though from the safety viewpoint chains should be used. When such chains are used, mounting requires either jacking up the wheel or laying the chain on the ground and rolling the car over it. If the vehicle is on ice or in snow, neither of these alternatives is safe even where it is possible. When loss of traction occurs in traffic, traffic jams develop as the result of the great amount of time required to install automobile tire chains. If the car is not in snow or on ice, as in a garage, when the chain is installed or removed, mounting and de-mounting, while relatively safe when properly done, is still a very dirty and messy job since it is practically impossible to avoid contact with the accumulated road dirt on the inside of the vehicle fender structures. Fastening and unfastening of the chain at the inside of the wheel, that is, at the side of the wheel adjacent the differential and axle, is particularly difficult and dirty in these operations.

The traction device of the present invention embodies a pair of rigid loops adapted to be mounted upon a pneumatic tire equipped wheel in substantially parallel relation to subtend opposed substantially chordal portions of the wheel. Devices of this type have been proposed heretofore but have not provided for the proper constraint of the loops relative to the tire and wheel during vehicle operation. Such prior art devices, when the loops are not properly constrained, become extremely difficult to remove from the wheel after extended use and can result in permanent injury to the tire. For this reason, their practical use has been limited to very short intervals such as may be necessary to remove a vehicle from a mud pocket in which it is stuck but are not applicable for extended driving either in the city or on the highway. An example of such prior art devices is shown in United States Patent No. 2,694,431, issued November 16, 1954, to D. A. Howard for "Traction Device for Vehicles."

With the foregoing considerations in view, it is a primary object of this invention to provide an effective general purpose traction device for pneumatic tire equipped automotive drive wheels which can be readily and rapidly mounted on the wheel while the wheel is in ground engagement without contact by the person involved with the vehicle fender structure and without reaching to the inside of the wheel.

More specifically, it is an object of this invention to provide a traction device of the type described above embodying a pair of rigid elongated loops permanently interconnected in end to end relation by an inextensible flexible connection, one of the loops being provided at the side thereof adjacent its opposite end with an inextensible flexible link permanently connected thereto at one end and provided with a fastening element at its opposite end, the other of the loops being provided with a complementary fastening element permanently connected thereto at the side thereof adjacent its opposite end.

A further object of this invention is to provide a rigid loop type traction device for pneumatic tire equipped automotive vehicles which is so constructed that the loops are readily mountable on and demountable from a tire and will remain in place during driving without injury to the tire.

These and other objects of the present invention will become more fully apparent by reference to the appended claims and as the following detailed description proceeds with reference to the accompanying drawings wherein:

FIGURE 1 is a plan view of the traction device as it appears when laid upon a flat surface;

FIGURE 2 is a side elevational view of the traction device when placed beside an automotive vehicle drive wheel as the initial step of installation, the outline of a typical vehicle fender construction being shown in phantom lines;

FIGURE 3 is a view similar to FIGURE 2 showing the traction device of the present invention fully installed upon the vehicle wheel; and FIGURE 4 is a diagrammatic illustration of the manner in which rigid loop type traction devices on which motion of the loops relative to the tire is not properly constrained will distort the tire during operation.

Referring now to FIGURE 1, the traction device of the present invention comprises a pair of elongated rigid loops 10 and 12 each preferably formed of hardened metal rod, bent to the outline shown and butt welded at its abutting ends connected in end to end relation by an inextensible flexible connection 14, an inextensible link 16 connected to loop 10 at one side adjacent its opposite end and provided with a fastening element 18, and a complementary fastening element 20 permanently connected to the loop 12 at one side adjacent its opposite end.

The loop 10 is of elongated construction having sides 22 and 24 and ends 26 and 28 defining an aperture 30 of a configuration substantially identical with the outline of a substantially chordal section of a pneumatic tire equipped wheel. Loop 12 is of substantially identical construction to loop 10, the corresponding parts of which have been indicated by the same reference numeral with the letter "a" added. While for general applications, it is preferable for the portions 22—28 of loop 10 and 22a and 28a of loop 12 to lie substantially in common planes, it may be desirable, particularly where deep mud is encountered, for the end portions of sides 22 and 24 to be bent slightly so that end 26 is out of the plane of the remainder of the loop with the result that ends 26 and 26a are more widely spaced than ends 28 and 28a when assembled on the wheel 60. This lifts the ends 26 and 26a slightly with respect to the ground 66 and thus makes the device easier to install in deep mud. While not absolutely essential, the loop 10 is preferably provided with a longitudinally extending traction chain 32 equal in length to the arcuate length of the tire tread periphery of the chordal tire portion subtended by the loop 10 when mounted upon the wheel as is more fully apparent by reference to FIGURE 3. Chain 32 is maintained at the central portion of the tread by transversely extending chains 34 and 36 fixed at their opposite ends to the sides 22 and 24 and of appropriate length for this purpose and to permit their installation upon the wheel as shown in FIGURE 3.

The flexible inextensible connection 14 is preferably formed by a pair of chains 38 and 40 and a transverse interconnecting chain 42, chains 38 and 40 being permanently connected at their opposite ends to the end portions 28 and 28a of the loops 10 and 12 as by welding. When the device is mounted on a wheel, chains 38 and 40 extend circumferentially along the tire tread and chain 42 prevents them from slipping off to the sides of the tire and thereby loosening the device on the wheel. The inextensible link 16 preferably comprises a chain 44 fixed at one end to a lug 46 fixed to side 24 of loop 10 adjacent its end 26. The fastening element 18 may be of any suitable rugged construction such as the fastening elements used on conventional tire chains but is preferably an eye bolt 48 fixed at its loop end to the last link 50 of chain 44 and provided with a self-locking lock nut 52. The complementary fastening element 20 is in the form of a lug 54 provided with an aperture 56 to receive the shank of the eye bolt 48 and is suitably permanently fixed to the side 24a of the loop 12 adjacent the end 26a, as by welding, in a position such that the aperture 56 is in alignment with bolt 48 when the device is placed on a wheel as shown in FIGURE 3.

As is best shown in FIGURE 2, the initial step of installing the traction device of the present invention upon a pneumatic tire equipped ground engaging vehicle drive wheel 60 is to place the device with the side of the loops 10 and 12 shown in FIGURE 2 adjacent the wheel 60 and with the connection 14 at the top of the wheel between the wheel 60 and the fender 62. With the device in this position, the connection 14 is supported in a position in which it can be readily placed over the top of the wheel without reaching under the fender 62. Installation is effected by grasping the loop 10 at any suitable position below the level of the fender 62, and twisting to slip over the forward portion of the wheel 60 in the position shown in FIGURE 3 and similarly grasping the loop 12 and twisting it in the opposite direction to slip over the rear portion of the wheel 60 to the position shown in FIGURE 3. The assembly is then completed by removing the nut 52 from the eye bolt 48, inserting the shank of the eye bolt 48 through the aperture 56, replacing the self-locking nut 52 upon the shank of the eye bolt 48 and tightening the nut 52 on the eye bolt 48 to bring the ends 26 and 26a of the loops 10 and 12 respectively together to a position in which the loops 10 and 12 firmly grip the wheel 60 and in which the sides 22 and 22a and 24 and 24a are substantially parallel as shown for the sides 22 and 22a in FIGURE 3.

When so assembled, the chains 32 and 32a extend along the periphery of the wheel 60 between the ends 26 and 28 and 26a and 28a of the loops 10 and 12 respectively and are snugly fitted to the contour of the tread and maintained in their centralized position on the tread by the chains 34 and 36 and 34a and 36a respectively.

By this construction, the wheel will be supported, when rolling, by the chains 32 and 32a and the inextensible connection 14 throughout the major portion of its rolling contact with the ground indicated at 66. The only space in which the periphery of the wheel 60 is not provided with a circumferentially extending traction element is the space between the ends 26 and 26a of the loops 22 and 22a. While a slight bump will be noted in driving a vehicle equipped with a traction device of the present invention during the portion of the revolution of wheel 60 in which the portion of the tire tread of wheel 60 between ends 26 and 26a comes in contact with the ground 66, this bump is no more objectionable than the series of bumps which are encountered during each wheel revolution in the use of conventional automobile tire chains.

The inextensible connection 14 should either extend between the end portions 28 and 28a along the periphery of the wheel 60, as illustrated in FIGURE 3, or may interconnect sides 22 and 22a and sides 24 and 24a of the loops 10 and 12 closely adjacent their juncture with end portions 28 and 28a respectively if two bumps per wheel revolution are not found objectionable. This arrangement prevents separation of the ends 28a and 28 circumferentially of the wheel as the vehicle is driven with the traction device in place as is inherent if the rigid loops 10 and 12 were connected by an inextensible connection extending therebetween closely adjacent the axle as illustrated in FIGURE 4. The action of improperly constrained rigid loops is illustrated in FIGURE 4. When a pair of rigid loops such as 70 and 72 are interconnected merely by a pair of inextensible connections 74 and 76 located adjacent the center of the wheel 60 as illustrated in FIGURE 4 and no inextensible cross links corresponding to links 34 and 36 and 34a and 36a are provided, the loops 70 and 72 tend to gradually pivot about their connections to one of the inextensible connections 74 or 76 and gradually assume the configuration with respect to wheel 60 as shown in FIGURE 4 as the vehicle is driven. In doing so, the ends of the loops 70 and 72, which come together, form a depression 78 in the periphery of the pneumatic tire. This depression becomes very pronounced and not only results in a very bumpy ride but also constitutes a distortion of the tire which can produce permanent damage to the tire if one continues to drive on it in this distorted condition. When the loops 70 and 72 are in the position illustrated in FIGURE 4, it is extremely difficult to remove them from the tire. In addition, this results in one of the inextensible connections, such as 14 or 16, becoming quite loose requiring re-tightening, if possible, to prevent that loosened inextensible connection from hitting the fender with the well-known loud and unpleasant noise of a broken tire chain. Where this is not possible, eventual destruction of a portion of the fender results if use continues.

The present invention prevents this potential shifting of the loops 10 and 12 by the combined action of the location of the inextensible connections 14 and 16 and the chains 32, 34 and 36 and 32a, 34a and 36a. Either of these features alone substantially lessens the shifting of the rigid loops during vehicle operation and together these features completely eliminate the undesired shifting of the loops 10 and 12 to a position in which they distort the tire and become difficult to remove. Connections 14 and 16 prevent either the ends 28 and 28a or the ends 26 and 26a from separating from their initially installed positions and the chains 32, 34, 36, 32a, 34a and 36a establish the maximum circumferential tread portions of the tire which the loops 10 and 12 respectively can subtend so that it is impossible for the ends 28 and 28a or the ends 26 and 26a to move closer together than their initially installed positions to produce a depression such as is illustrated at 78 in FIGURE 4.

Thus with the present traction device, the loops 10 and 12 remain in the positions in which they are installed, that is, preferably substantially parallel subtending opposite chordal portions of the wheel 60 and the connections 14 and 16 both remain tight during operation. The loops 10 and 12, since they are maintained in their installed positions, do not tend to separate at one end and come together at the other end to dig into the tread of the tire. As a result, the device can be readily demounted from the wheel 60 merely by rolling the wheel to the position in which link 16 is readily accessible, preferably the position of the device shown in FIGURE 3, disconnecting connecting element 18 and 20 and lifting the loops 10 and 12 from the wheel 60 in substantially the reverse of the manner described above for installation in reference to FIGURE 2.

While the particular arrangement of the chains 32, 34 and 36 for the loop 10 and the chains 32a, 34a and 36a for the loop 12 need not be of the configuration illustrated, it is desirable for the reasons pointed out above to provide some chain or traction structure on each of the loops 10 and 12 when the device is being used for continuous driving rather than for merely providing traction for a few moments to remove a vehicle from a position in which it is stuck. The arrangement of a longitudinally extending chain such as 32 and 32a for the loops 10 and 12, has been found to improve the smoothness and comfort of the ride as compared with the ride which is obtained when using merely transverse links on the tire tread portion. This effect is achieved particularly when the rod material, usually hardened steel, of which the loops 10 and 12 are made, are of substantially the same diameter as the maximum cross section of the links of the chain 32.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a pneumatic tire equipped automotive vehicle wheel, a traction device comprising a pair of loops each in the form of a substantially rigid hollow rectangular frame, said loops embracing opposite chordal portions of said wheel, means extending circumferentially of the periphery of the wheel between said loops at one of their adjacent ends establishing a maximum magnitude of circumferential separation of said loop one ends, selectively disengageable means interconnecting said loops at the exterior side of said wheel adjacent their opposite adjacent ends to firmly secure said loops to said wheel, at least one inextensible traction element snugly overlying the portion of the tire tread embraced by each of said loops and anchored at its opposite ends through the associated loop.

2. In combination with a pneumatic tire equipped automotive vehicle wheel, a traction device comprising a pair of rigid loops embracing opposite chordal portions of said wheel, means extending between said loops at one of their adjacent ends adjacent the circumference of the wheel establishing a maximum magnitude of circumferential separation of said loop one ends, and selectively disengageable means interconnecting said loop at the exterior side of said wheel adjacent their opposite ends and the periphery of the wheel to firmly secure said loops to said wheel, and at least one inextensible traction element snugly overlying the portion of the tire tread embraced by each of said loops and anchored at its opposite ends to the associated loop.

3. A traction device for pneumatic tire equipped automotive vehicle drive wheels comprising:
 (a) a pair of rigid loops adapted to snugly embrace opposite substantially chordal portions of a wheel,
 (b) each of said loops having substantially parallel end portions adapted to extend transversely of the tread of the tire of such a weel and interconnecting portions adapted to extend substantially chordally of such a wheel at the opposite sides thereof,
 (c) inextensible means interconnecting one end portion of one of said loops to one end portion of the other of said loops to establish a maximum magnitude of separation of said one end portions when mounted on such a wheel such that the interconnecting portions of said loops lie substantially in parallel chordal planes of such a wheel,
 (d) selectively connectible means adapted to extend between the interconnecting portions of said loops adjacent the other of said end portions at but one side of such a wheel when said device is mounted on such a wheel,
 (e) said selectively connectible means and said inextensible means being operative when said device is assembled on such a wheel to establish a maximum magnitude of separation between said loop end portions, and
 (f) at least one chain extending between the end portions of each said loop,
 (g) said chains being of such greater length than the spacing between said loop end portions that said chains will extend circumferentially of the tread of a tire of such a wheel when said device is mounted thereon.

4. The traction device defined in claim 3 wherein the interconnecting portions and at least one of said end portions of each of said loops are rigid and rigidly interconnected.

5. The traction device defined in claim 4 wherein the other of said loop end portions of said loops are rigid and rigidly interconnected to the rigid interconnecting portions of the associated loop.

6. A traction device for pneumatic tire equipped automotive vehicle drive wheels comprising:
 (a) a pair of rigid loops adapted to snugly embrace opposite substantially chordal portions of a wheel,
 (b) each of said loops having substantially parallel end portions adapted to extend transversely of the tread of the tire of such a wheel and interconnecting portions adapted to extend substantially chordally of such a wheel at the opposite sides thereof,
 (c) inextensible means interconnecting one end portion of one of said loops to one end portion of the other of said loops to establish a maximum magnitude of separation of said one end portions when mounted on such a wheel such that the interconnecting portions of said loops lie substantially in parallel chordal planes of such a wheel,
 (d) selectively connectible means adapted to extend between the interconnecting portions of said loops adjacent the other of said end portions at but one side of such a wheel when said device is mounted on such a wheel,
 (e) said selectively connectible means and said inextensible means to establish a maximum magnitude of separation between said loop end portions, and
 (f) at least one chain extending between the end portions of each said loop,
 (g) said chains being of such greater length than the spacing between said loop end portions that said chains will extend circumferentially of the tread of a tire of such a wheel when said device is mounted thereon,
 (h) each said chain being connected to the interconnecting portions of the associated loop by laterally extending chain portions.

7. A traction device for pneumatic tire equipped automotive vehicle drive wheels comprising:
 (a) a pair of rigid loops adapted to snugly embrace opposite substantially chordal portions of a wheel,
 (b) each of said loops having substantially parallel end portions adapted to extend transversely of the tread of the tire of such a wheel and interconnecting portions adapted to extend substantially chordally of such a wheel at the opposite sides thereof, said interconnecting portions and at least one of said end portions being rigid and being rigidly interconnected.
 (c) inextensible means interconnecting one end portion of one of said loops to one end portion of the other of said loops to establish a maximum magnitude of separation of said one end portions when mounted on such a wheel such that the interconnecting portions of said loops lie substantially in parallel chordal planes of such a wheel,
 (d) selectively connectible means adapted to extend between the interconnecting portions of said loops adjacent the other of said end portions at one side of such a wheel when said device is mounted on such a wheel,
 (e) said selectively connectible means and said inextensible means being operative when said device is assembled on such a wheel to establish a maximum magnitude of separation between said loop end portions, and
 (f) chain means for each said loop extending between the end portions thereof, (g) said chain means being of such greater length than the spacing between said loop end portions that said chain means will extend circumferentially of the tread of a tire of such a wheel when said device is mounted thereon.

8. A traction device for pneumatic tire equipped automotive vehicle drive wheels comprising:
   (a) a pair of rigid loops adapted to snugly embrace opposite substantially chordal portions of a wheel,
   (b) each of said loops having substantially parallel end portions adapted to extend transversely of the tread of the tire of such a wheel and interconnecting portions adapted to extend substantially chordally of such a wheel at the opposite sides thereof,
   (c) inextensible means interconnecting one end portion of one of said loops to one end portion of the other of said loops to establish a maximum magnitude of separation of said one end portions when mounted on such a wheel such that the interconnecting portions of said loops lie substantially in parallel chordal planes of such a wheel,
   (d) selectively connectible means adapted to extend between the interconnecting portions of said loops adjacent the other of said end portions at one side of such a wheel when said device is mounted on such a wheel,
   (e) said selectively connectible means and said inextensible means being operative when said device is assembled on such a wheel to establish a maximum magnitude of separation between said loop end portions,
   (f) an extensible flexible traction element fixed at its opposite ends with respect to the end portions of each said loop,
   (g) said traction elements being of such greater length than the spacing between said loop portions that said traction elements will circumferentially conform to the underlying peripheral portion of a tire of which such a wheel when said device is mounted thereon.

9. A traction device for pneumatic tire equipped automotive vehicles driving wheels comprising:
   (a) a pair of rigid loops adapted to snugly embrace opposite substantially chordal portions of a wheel,
   (b) each of said loops having substantially parallel end portions adapted to extend transversely of the tread of the tire of such a wheel and interconnecting portions adapted to extend substantially chordally of such a wheel at the opposite sides thereof,
   (c) means interconnecting one end portion of one of said loops to the adjacently disposed end portion of the other of said loops and including an inextensible flexible traction element adapted to overlie the portion of said tread located between said one end portions of said loops to establish a maximum magnitude of separation of said one end portions when mountel on a wheel and to restrict the angular displacement of said interconnecting portions of said loops; and
   (d) selectively connectible means adapted to extend between the interconnecting portions of said loops adjacent to the other of said end portions at one side of said wheel when said device is mounted on such a wheel,
   (e) said selectively connectible means and said inextensible element being operative when said device is assembled on such a wheel to establish a maximum magnitude of separation between said loop portions.

References Cited in the file of this patent
UNITED STATES PATENTS

| | | |
|---|---|---|
| 2,694,431 | Howard | Nov. 16, 1954 |
| 2,830,639 | Clark | Apr. 15, 1958 |

UNITED STATES PATENT OFFICE
CERTIFICATE OF CORRECTION

Patent No. 3,087,527                                 April 30, 1963

William A. Crider

It is hereby certified that error appears in the above numbered patent requiring correction and that the said Letters Patent should read as corrected below.

Column 5, line 49, for "weel" read -- wheel --; column 8, line 2, strike out "which"; line 20, for "mountel" read -- mounted --.

Signed and sealed this 10th day of December 1963.

(SEAL)
Attest:

EDWIN L. REYNOLDS

ERNEST W. SWIDER
Attesting Officer                                       Acting Commissioner of Patents